(12) United States Patent
Yamano et al.

(10) Patent No.: US 8,169,361 B2
(45) Date of Patent: May 1, 2012

(54) ELECTRONICALLY SCANNED RADAR SYSTEM

(75) Inventors: Chiharu Yamano, Tokyo (JP); Kazuma Natsume, Oobu (JP); Yuu Watanabe, Toyota (JP); Mai Sakamoto, Kounan (JP)

(73) Assignee: Denso Corporation, Kariya, Aichi-pref. (JP)

( * ) Notice: Subject to any disclaimer, the term of this patent is extended or adjusted under 35 U.S.C. 154(b) by 465 days.

(21) Appl. No.: 12/521,248

(22) PCT Filed: Dec. 26, 2007

(86) PCT No.: PCT/JP2007/074946
§ 371 (c)(1),
(2), (4) Date: Jun. 25, 2009

(87) PCT Pub. No.: WO2008/078772
PCT Pub. Date: Jul. 3, 2008

(65) Prior Publication Data
US 2010/0019950 A1    Jan. 28, 2010

(30) Foreign Application Priority Data

Dec. 27, 2006  (JP) .................................. 2006-351918
Dec. 20, 2007  (JP) .................................. 2007-329119

(51) Int. Cl.
  *G01S 13/34*  (2006.01)
  *G01S 7/35*   (2006.01)

(52) U.S. Cl. ........ 342/159; 342/104; 342/109; 342/118; 342/192

(58) Field of Classification Search ................... 342/159
See application file for complete search history.

(56) References Cited

U.S. PATENT DOCUMENTS

| 6,121,917 | A  | 9/2000 | Yamada |
| 2006/0181448 | A1 | 8/2006 | Natsume et al. |
| 2008/0036645 | A1 | 2/2008 | Yamano et al. |

FOREIGN PATENT DOCUMENTS

| DE | 102006006781 A1 | 8/2006 |
| DE | 102007009385 A1 | 8/2007 |
| JP | 11-133142 A     | 5/1999 |
| JP | 2002-014160 A   | 1/2002 |
| JP | 2006-220624 A   | 8/2006 |
| JP | 2006-300720 A   | 11/2006 |
| JP | 2007-232383 A   | 9/2007 |

*Primary Examiner* — Thomas Tarcza
*Assistant Examiner* — Matthew M Barker
(74) *Attorney, Agent, or Firm* — Harness, Dickey & Pierce, P.L.C.

(57) ABSTRACT

A sampled beat signal RD is split into a plurality of short-time data SD in the time direction, for each of antenna elements. Interference component frequency of an interference wave is detected from a frequency spectrum of the short-time data SD. A digital beam forming process is performed for the interference component frequency of the interference wave to extract a peak of the electrical power of an azimuth direction and estimate an absolute value of an incoming direction of interference components. Based on the absolute value of the incoming direction of the estimated interference components, a filter for suppressing the interference components is operated to suppress the interference components.

18 Claims, 10 Drawing Sheets

ELECTRONICALLY SCANNED RADAR SYSTEM

TECHNICAL FIELD

The present invention relates to an electronically scanned radar system, and in particular to an on-vehicle electronically scanned radar system using the FM-CW technique, which is able to suppress interference signals contained in received signals.

BACKGROUND ART

Figure 1:
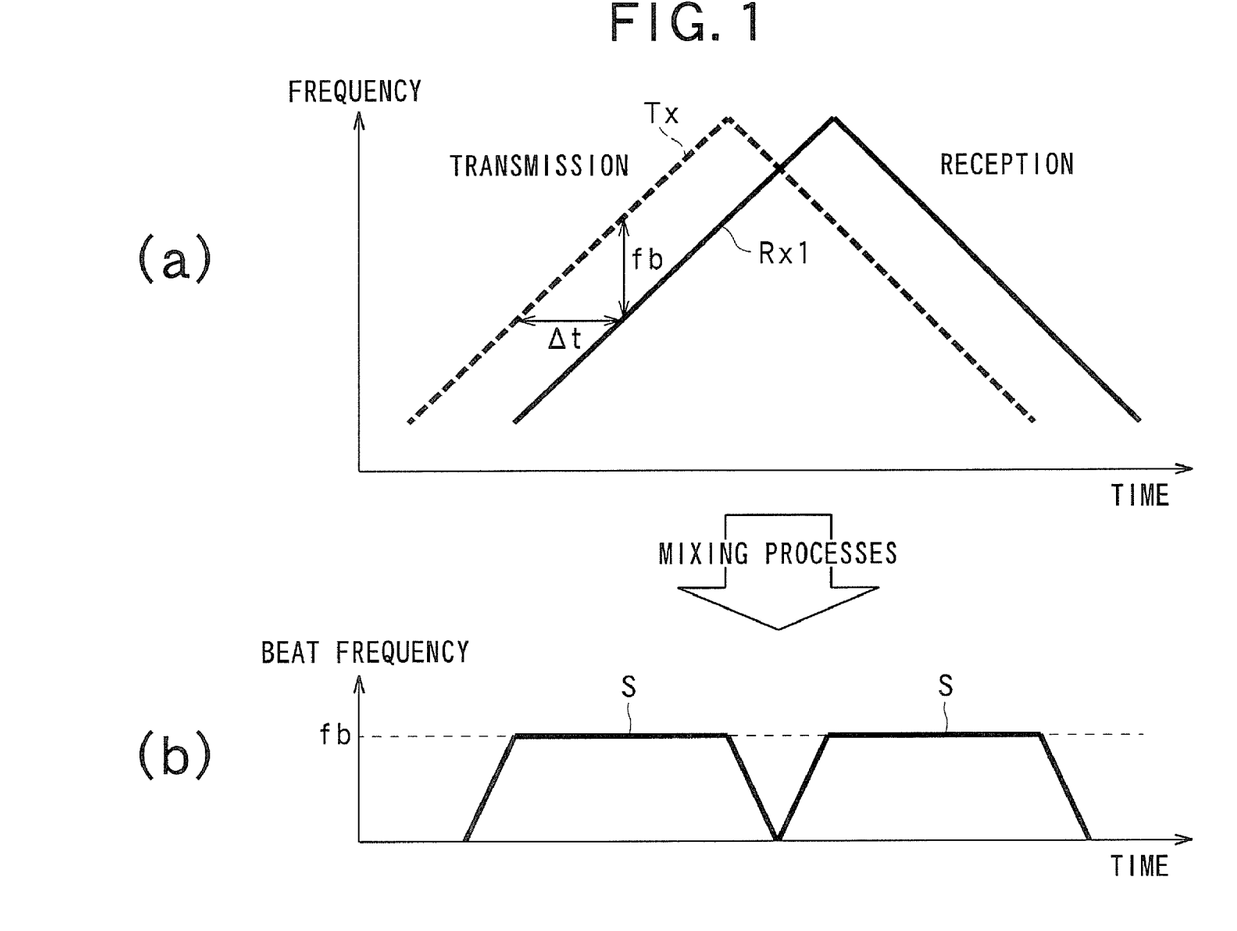
FIG. 1 shows by (a) transmission/reception signals in the FM-CW radar technique, and by (b) a timing diagram indicating the principle of mixing processes.
Figure 2:
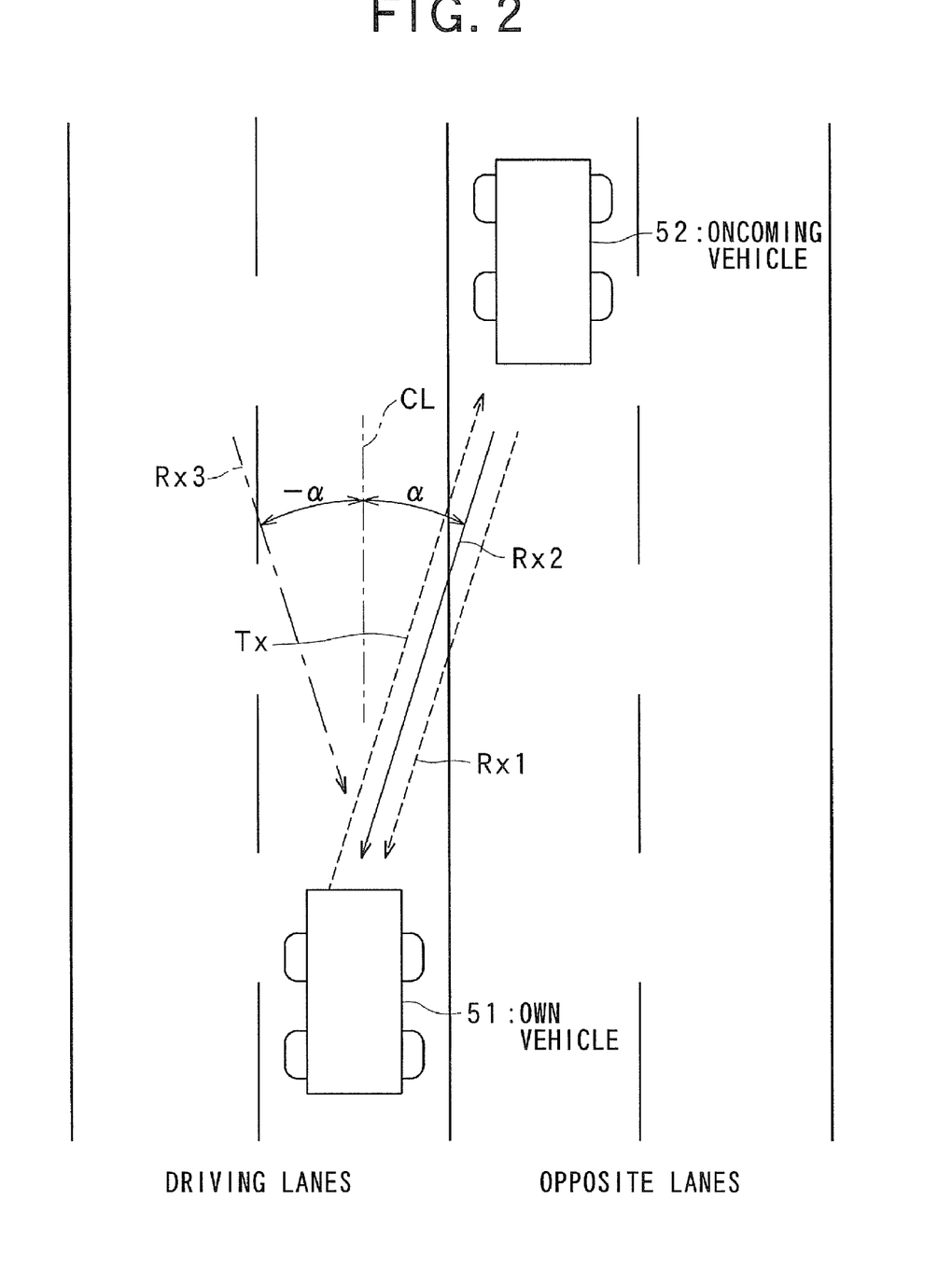
FIG. 2 shows a plan view illustrating an example of an environment of a road with opposite lanes.
Figure 3:
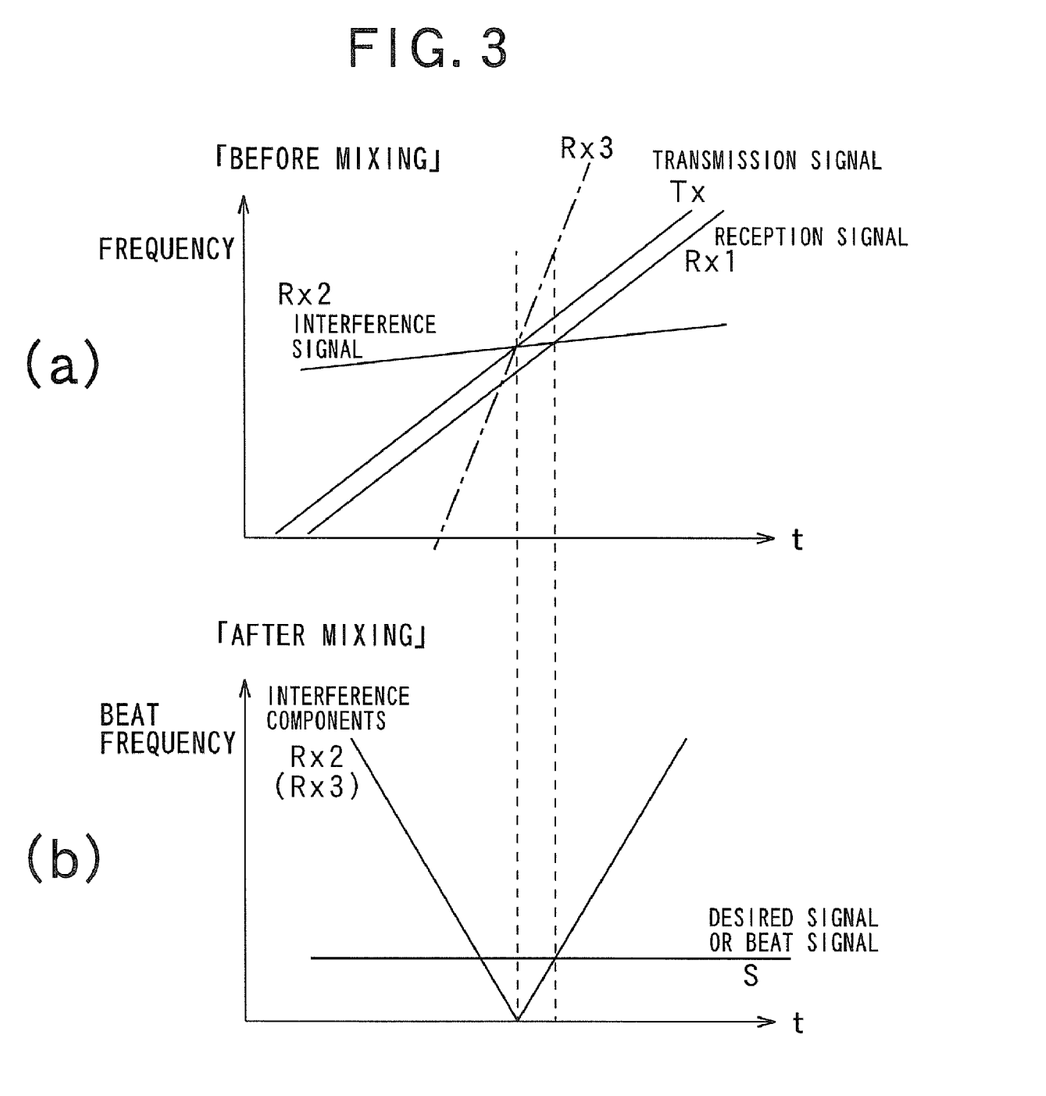
FIG. 3 shows by (a) frequency variation of a transmission wave, a reflected wave and an interference wave with respect to time, prior to performing mixing, and by (b) a beat signal after performing mixing of these signals.

FIG. 1 shows timing diagrams indicating transmitted/received signals and the principle of mixing processes in the FM-CM radar technique. FIG. 2 is a plan view illustrating an example of an environment of a road with opposite lanes. FIG. 3 shows by (a) and (b) conditions of signal processing in a radar system equipped in a vehicle in the case where an interference signal has been received from another vehicle.

In order to prevent collisions between vehicles and to perform inter-vehicle control, on-vehicle radars have been developed, which measure a distance, speed and azimuth associated with a front target, such as a preceding vehicle.

As a means for measuring a distance from a front target and a relative speed of the front target, the FM-CW radar technique has been used because, for example, this technique uses a signal processing circuit having a simplified configuration. Also, for measuring an azimuth, the electronic scanning technique has been used (e.g., refer to Patent Document 1).

In the FM-CW technique, a transmission wave Tx whose frequency change linearly as shown by (a) of FIG. 1 is horizontally transmitted over a predetermined angle in a fan-like form from a transmitting antenna, as shown in FIG. 2, centering on a vehicle center CL of a vehicle 51. The transmission wave Tx transmitted in a fan-like form is reflected by a target (e.g., oncoming vehicle 52), for the reception of a reflected signal Rx1 to thereby perform scanning of the fan-like region. Then, the reflected signal, or the reception signal Rx1, is mixed with the transmission signal Tx. This mixing produces a beat signal S, shown by (b) of FIG. 1, having a component of a frequency difference (beat frequency fb) between the transmission and reception signals. Conversion is carried out to obtain the distance using the fact that the frequency of the beat signal S is in proportion to a round-trip propagation delay time Δt for the target.

The techniques for measuring azimuth include the electronic scanning technique mentioned above, which enables scanning processes in all the azimuths in a short time. In the electronic scanning technique, a reflected wave from an object is received by a plurality of antenna elements (array antennas) arranged according to a certain rule. A time difference is caused between channels of received data, which time difference is determined by an azimuth α between a target and each antenna, an arranged position of each antenna, and frequency of a reception signal. Based on this time difference (or phase difference), an azimuth for the target can be detected. For example, digital beam forming (DBF) is known as a means for realizing such a technique. In the DBF, an azimuth is detected by digitizing a received data using an AD converter, and then correlating each channel with a vector data (mode vector) (e.g., refer to Non-patent Document 1).

In a road, as shown in FIG. 2, for example, which is busy with a number of vehicles equipped with radar systems, a radio wave Rx2 transmitted from a radar equipped in a vehicle 52 traveling along an opposite lane may be received by a radar equipped in another vehicle. Thus, the radio wave Rx2 from the oncoming vehicle (transmission wave from the oncoming vehicle) may interfere with a reflected signal Rx1 that is the reflection from a target, which is caused by the radio wave (transmission wave) Tx emitted from the other vehicle. In particular, the electrical power level tends to be high in a direct transmission wave emitted from each of the transmitting antennas of the radars loaded on other vehicles. In the case where the radars loaded on other vehicles use a modulation technique, such as the FM-CW technique, which involves a narrow-band signal, the electrical power level of the signal will be higher. The interference signal of a large electrical power level can be a major cause of the deterioration in the accuracy of measurement.

Under such circumstances, it will be effective to suppress the interference components contained in the reception signal. Methods have been suggested, for example, for suppressing the interference components by utilizing a filter for suppressing components coming from a particular azimuth (e.g., refer to Non-patent Document 2).

[Non-patent Document 1]
"Adaptive signal processing by array antennas" by Nobuyoshi Kikuma, Science and Technology Publishing Co., Ltd., 1998

[Non-patent Document 2]
"Adaptive mainbeam jamming suppression for multi-function radars" by T. J. Nohara et al.

[Patent Document 1]
Japanese Patent Laid-Open No. 11-133142

DISCLOSURE OF THE INVENTION

Problems to be Solved by the Invention

However, the electronic scanned radars using the FM-CW technique have some difficulty in direct application of such methods, The reasons for this will be described below.

Modulation techniques for coping with interference signal components, which are used by other vehicles, may be based on the FM-CW technique or the CW technique. In such a case, the frequency modulation of the reflected signal Rx1, which is the reflection from a target caused by the radio wave (transmission wave) Tx emitted from an own vehicle, will be the same as the frequency modulation of the transmission signal Tx as shown by (b) of FIG. 3. Therefore, the beat frequency after mixing will substantially be constant with respect to time, and this constant beat frequency presents the beat signal corresponding to the desired signal. On the other hand, the transmission wave Rx2, which is an interference wave from an oncoming vehicle (hereinafter referred to as an interference wave), is a signal from a radar equipped in another vehicle. Therefore, the frequency modulation of the interference wave Rx2 will not be the same as the frequency modulation of the reflection signal Rx1, which is the reflection from a target caused by the transmission wave Tx emitted from the own vehicle. For example, the bandwidth of the modulated frequency or the modulation speed may be different depending on standards. In another case, for example, even if the standard of the radar equipped in an oncoming vehicle or the like is equal to that of the radar equipped in the own vehicle, the reflection signal Rx1 and the interference wave Rx2 cannot substantially have completely the same frequency modulation. This is because there may be a difference in the frequency modulation caused by the individual differences between radars, which depend on manufacturing processes, for example. Accordingly, as can be seen from (a) of FIG. 3, the beat frequency of the interference wave Rx2 coming in from another vehicle, transits with respect to time. Specifically, the information indicating a condition that frequency transits with respect to time, or in other words, a condition that frequency varies with respect to time, is time transient information on frequency spectrum. Therefore, when the signal is subjected to frequency analysis with the interference wave, the signal may resultantly appear as a broadband signal component.

Further, as can be seen from (a) and (b) of FIG. 3, the beat frequency of the interference wave Rx2 that transits with respect to time is replicated (reversed) on reaching a zero point where the frequency of the interference wave Rx2 intersects with the frequency of the transmission wave Tx. The component of the replicated frequency has a frequency sign which is reverse of the frequency sign prior to the replication. As a result, as shown in FIG. 2 and (a) of FIG. 3, no distinction can be made between the interference wave Rx2, or the intrinsic interference component, coming in from an incoming azimuth α and a radio wave Rx3 coming in from an azimuth −α (radio wave that actually does not come in) which is a reverse of the incoming azimuth α. Even when an azimuth detection processing is carried out with reception data of every snapshot, with respect to the replicated signal whose frequency varies with time, no interference signal component appear at a fixed azimuth. In this way, the beat signal extending over a broadband causes the interference wave Rx2 to replicate at the zero point, disabling directional distinction from an interference signal. Thus, it has been difficult to apply methods that utilize azimuth, to such an interference signal that disables directional distinction, for the purpose of suppressing interference.

In light of the circumstances described above, the present invention has as its object to provide an electronically scanned radar system which is able to suppress interference even with a radar using the FM-CW technique.

Means for Solving the Problems

The invention of claim 1 is an electronically scanned radar system comprising: a transmitting antenna for freely emitting a transmission signal consisting of a continuous wave; a receiving antenna consisting of antenna elements corresponding to respective channels; a mixer for obtaining a beat signal by mixing a reception signal received by each of the antenna elements with the transmission signal; an AD converter for obtaining reception data consisting of an N number of sampled data by sampling the beat signal obtained by the mixer at a predetermined sampling frequency; and a target detection section for detecting a distance from a target or/and a relative speed of the a target, on the basis of the reception data sampled by the AD converter, characterized by: a data cutting out part for cutting out an (N−M+1) number of data each consisting of an M(<N) number of sampled data continuous in the time direction, from the reception data consisting of the N number of sampled data; a frequency spectrum calculation part for calculating a frequency spectrum of each of the (N−M+1) number of data; an interference frequency detection part for detecting an interference component frequency of an interference wave from the frequency spectrum; an interference component removal part for removing the interference component frequency from the beat signal, the interference component frequency being detected by the interference frequency detection part; a buffer part for merging the data cut out by the data cutting out part and removed with the frequency components to restore a data having a length before being cut out; and detection of a distance from the target or/and a relative speed of the target on the basis of the data restored by the buffer part.

As recited in claim 2, the data cutting out part advantageously sets the number M so that the frequency is substantially unchanged in the continuous M number of sampled data in the case where the M number of sampled data is sampled by the sampling frequency.

As recited in claim 3, in removing the interference component frequency detected by the interference frequency detection part from the beat signal, the interference component removal part advantageously removes the beat signal from a portion where the beat signal corresponding to the reception wave intersects with the beat signal corresponding to the interference wave.

As recited in claim 4, it is also advantageous that the interference component removal part is a projection matrix working on the data cut out by the data cutting out part.

As recited in claim 5, it is also advantageous that the channel is provided in plural number, and a plurality of reception antennas are provided, each reception antenna consisting of antenna elements corresponding to the plurality of channels; the mixer is provided in plural number in order to obtain a beat signal for each of the antenna elements by mixing a reception signal received by each of the antenna elements with the transmission signal; and the AD converter is provided in plural number in order to sample the beat signal of each of the channels at a predetermined sampling frequency, which beat signal has been obtained from each of the plurality of mixers, to obtain the reception data consisting of the N number of sampled data for each of the channels corresponding to the respective antenna elements.

As recited in claim 6, it is also advantageous that the system comprises a peak direction extraction part for performing a digital beam forming process for the interference component frequency to extract a peak of the electrical power of an azimuth direction from the interference component frequency, and the interference component removal part is adapted to calculate an absolute value of an incoming direction of the interference component frequency extracted at the peak direction extraction part and form a filter for removing the interference component frequency on the basis of the absolute value.

As recited in claim 7, it is also advantageous that the system comprises a peak direction extraction part for performing a digital beam forming process for the interference component frequency to extract a peak of the electrical power of an azimuth direction from the interference component frequency, and the interference component removal part is adapted to use a filter for removing only a portion where the beat signal corresponding to the interference wave coming from the same direction as that of the reception wave intersects with the beat signal corresponding to the reception signal, from the beat signal in a portion where the beat signal corresponding to the reception signal intersects with the beat signal corresponding to the interference wave.

As recited in claim 8, it is also advantageous to use a filter having a projection matrix that works on the data cut out by the data cutting out part.

As recited in claim 9, it is also advantageous to configure the interference frequency detection part so as to detect the interference component frequency on the basis of time transient information of the frequency spectrum.

As recited in claim 10, it is also advantageous to configure the interference frequency detection part so as to detect a component as the interference component frequency, which component maximizes an electrical power value of the frequency spectrum.

Advantages of the Invention

According to the invention of claim 1, the sampled data obtained after performing sampling is made into at least two or more continuous cut-out data. Thus, a beat signal can be captured as temporally transited information, that is, information of at least two or more timings. Thus, frequency variation of an interference wave in the interference frequency components, relative to time can be estimated. Further, when the estimated interference component frequency is removed by the interference component removal part, the influence of the interference wave can be suppressed.

In the invention of claim 2, M is set so that the frequency is substantially unchanged in the M number of sampled data. Thus, the cut-out sampled data substantially has no frequency variation in the interference frequency components, relative to time, which variation can be seen after sampling. Accordingly, the beat frequency of the interference components can be more properly detected in the time segment.

In the invention of claim 3, removal of the interference frequency is ensured to be performed by having the interference component removal part removing the beat signal in a portion where the beat signal corresponding to the reception wave intersects with the beat signal corresponding to the interference wave. For example, when a transmission wave of an own vehicle is reflected by a target, the beat signal of the reflected wave is a signal which does not transit with respect to time, while the interference wave is a signal which transits with respect to time. Thus, the beat signal corresponding to the interference wave intersects with the beat signal corresponding to the intersecting reception wave. This intersecting portion cannot be identified as being a reception wave or an interference wave. Therefore, removal of this portion can suppress the influence of the interference wave.

As recited in claim 4, use of the projection matrix capable of removing an interference wave in the interference component removal part, may suppress the influence of the interference wave in a more accurate manner.

The present invention can be applied to a system having one channel each for transmission and reception. As recited in claim 5, however, the present invention is also useful in a system having a plurality of reception antennas. For example, when one channel is used for reception, it is required to mechanically orient the direction (angle) of transmission/reception, whereas provision of the plurality of reception antennas can dispense with such a mechanical mechanism, for example.

As recited in claim 6, if a digital beam forming (DBF) function is provided, azimuth information can be obtained in the form of an absolute value. Then, when a filter is set according to an absolute value of the azimuth information, removal of the interference wave can be realized, while allowing the beat signal of the original reception wave to remain as much as possible.

As recited in claim 7, upon obtaining the azimuth information using DBF, the incoming azimuth of the original reception wave can be distinguished from the incoming azimuth of the interference wave. However, when the incoming azimuths are the same, no distinction can be made between the interference wave and the reception wave. Removal of the interference wave from this point of view can suppress the influence of interference.

As recited in claim 8, the influence of the interference wave can be more accurately suppressed by using as a filter the projection matrix which is able to remove the interference wave.

According to the invention of claim 9, time transient information of the interference frequency is used in order to adequately detect the beat frequency of the interference components. Specifically, as described above, the beat frequency of the reflected wave Rx1 from a target is substantially constant with respect to time. On the other hand, the beat frequency of the interference wave Rx2, which us the signal from another radar system, transits with respect to time. For example, as shown by (a) of FIG. 3, when the inclination of modulation of the subject radar system is different from that of the radar system loaded on another vehicle, the beat frequency presents a primary linear transition. In this regard, focusing on the transition of the beat frequency, if a determination as being the interference components is made when transition occurs exceeding a certain level, then the detection can be performed accurately.

According to the invention of claim 10, electrical power information of the interference frequency is used in order to adequately detect the beat frequency of the interference components. Specifically, when the electrical power of the interference wave is larger than that of the reflected wave from a target, the accuracy of measurement will be drastically deteriorated. In this regard, when the electrical power is large, accurate detection can be efficiently conducted by detecting a frequency that maximizes the peak, as the interference components.

DESCRIPTION OF REFERENCE SYMBOLS

1 ... Electronically scanned radar system
5 ... Transmitting antenna
6 ... Antenna element
10 ... Mixer
13 ... A/D converter
17 ... Target detection section
18 ... Interference frequency detection part
19 ... Short-time data cutting out part
20 ... Frequency spectrum calculation part
26 ... Interference azimuth component removal part
27 ... Buffer part
S3, S4, RD ... Beat signals
RX ... Reception signal
TX ... Transmission signal

BEST MODE FOR CARRYING OUT THE INVENTION

With reference to the drawings, hereinafter will be described a first embodiment of the present invention.

Figure 4:
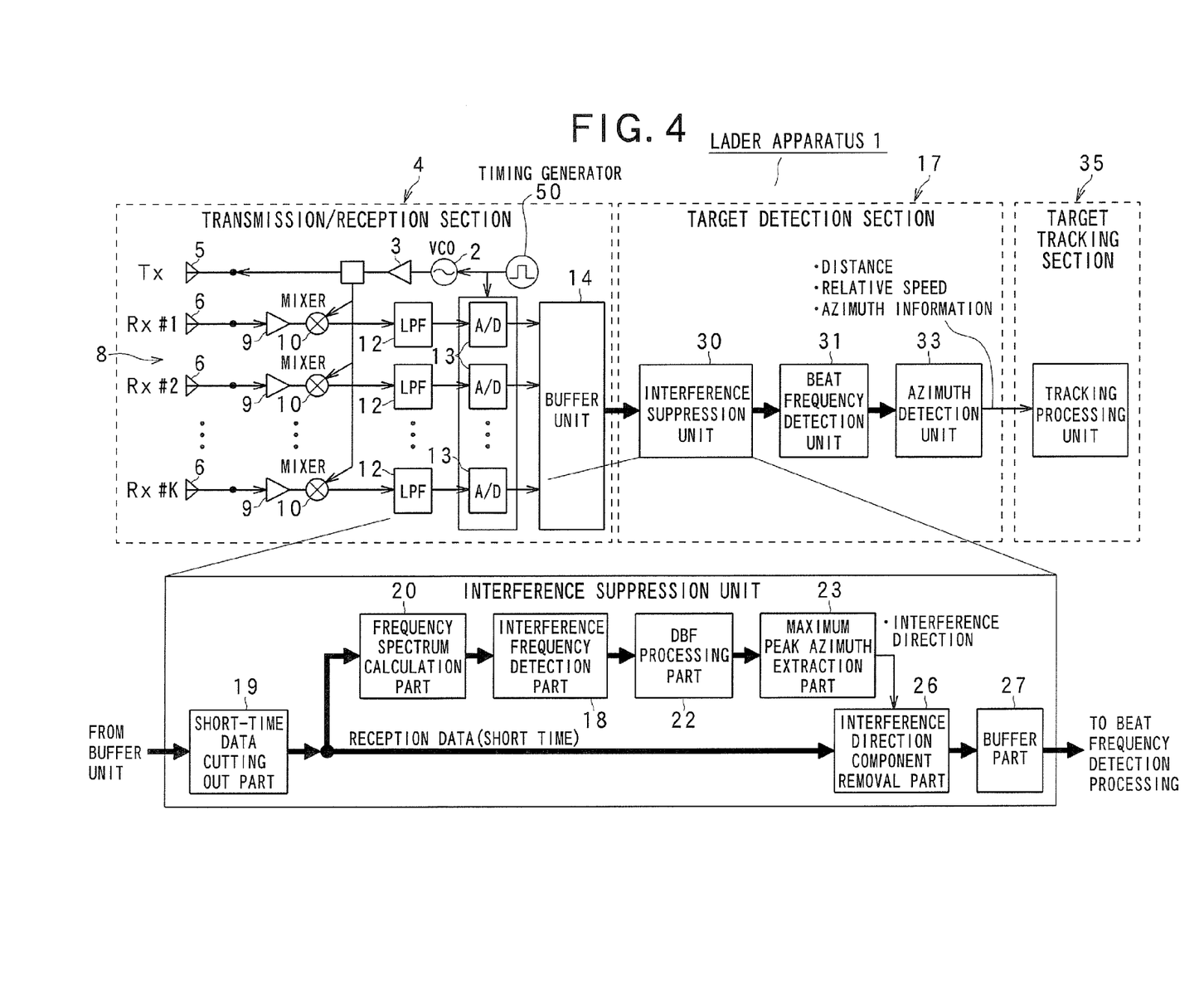
FIG. 4 is a block diagram illustrating an embodiment of an electronically scanned radar system of the present invention.

FIG. 4 is a block diagram illustrating an electronically scanned radar system 1 according to an embodiment of the present invention. The radar system 1 is an FM-CW radar system using a transmission signal Tx which is obtained by applying frequency modulation (FM) to a continuous wave (CW). Also, the radar system 1 is a DBF radar system which performs digital beam forming processes within receiving array antennas 8. The radar system 1 is a so-called on-vehicle radar system loaded on a vehicle, which detects, for example, a distance to a vehicle (target) traveling ahead or a relative speed of the vehicle traveling ahead. The results of the detection of the radar system 1 are utilized, for example, as information for controlling traveling of the vehicle. Microwaves are used as transmission waves, The radar system 1 has a transmission/reception section 4 which includes: an oscillator 2 having a center frequency f0 (e.g., 76 GHz) and connected to a timing generator 50; an amplifier 3; and a transmitting antenna 5. The oscillator 2 outputs a signal which is obtained by applying triangular wave modulation with a frequency modulation width ΔF, to a carrier wave having the frequency f0 by using control voltage outputted from a DC power source for modulation, not shown. That is, the oscillator 2 outputs a modulated wave (transmission wave Tx) at a frequency f0±ΔF/2. The modulated signal is amplified by the amplifier 3 and emitted as an electromagnetic wave from the transmitting antenna 5. The transmission waves are partially outputted to a mixer 10 to serve as local signals for reception detection. In order to have the transmitting antenna 5 had desired horizontal directivity, the transmitting antenna 5 is made up of four element antennas, for example, not shown.

The receiving array antennas 8 provided at the transmission/reception section 4 have a K number of uniformly spaced linear array antenna elements 6 correspond to channels from a first channel (#1) to a K$^{th}$ channel (#K). Each of the antenna elements 6 is made up of two component antennas and, similar to the transmitting antenna 13, is permitted to have fixed horizontal directivity.

Reception waves Rx (1 to K) from the antenna elements 6 are amplified by respective RF amplifiers 9 and mixed with distributed transmission waves Tx by respective mixers 10. Each of the reception signals Rx is down-converted by this mixing to produce, as shown by (b) of FIG. 1, a beat signal S, that is, a differential signal resulting from the difference between the transmission wave Tx and the reception wave Rx (1 to K). The technique for obtaining the beat signal S based on the reception wave Rx (1 to K) and the transmission signal Tx is well known as described, for example, in Japanese Patent Laid-Open No. 11-133142. Therefore, description of the detailed processes is omitted herein.

In the FM-CW technique for triangular wave modulation, the following Formulas can be established:

$$fb1 = fr - fd \quad (1)$$

$$fb2 = fr + fd \quad (2)$$

where fr is the beat frequency when relative speed is zero, fd is the Doppler frequency based on the relative speed, fb1 is the beat frequency in a zone where frequency increases (up-zone), and fb2 is the beat frequency in a zone where frequency decreases (down-zone).

Accordingly, when the beat frequencies fb1 and fb2 in the up- and down-zones, respectively, in modulation cycle are separately measured, fr and fd can be obtained from the following Formulas (3) and (4):

$$fr = (fb1 + fb2)/2 \quad (3)$$

$$fd = (fb2 - fb1)/2 \quad (4)$$

Calculation of the beat frequency fr and the Doppler frequency fd when the relative speed is zero, can lead to the calculation of a distance R from a target and a speed V of the target with the following Formulas (5) and (6):

$$R = (C/(4 \cdot \Delta F \cdot fm)) \cdot fr \quad (5)$$

$$V = (C/(2 \cdot f0)) \cdot fd \quad (6)$$

where C is the speed of light, F0 is the center frequency, ΔF is the frequency modulation width for the carrier wave of the frequency f0, and fm is the FM modulation frequency.

Produced beat signals S3 for individual antenna elements 6 pass through respective low-pass filters 12 provided for the individual antenna elements 6, and are sampled and quantized by respective A/D converters 13 at sampling frequency f to provide an N number of sampled data for every snapshot. The sampled data are stored in a buffer unit 14, in the form of a K (channels)×N number of reception data DT1 as expressed by the following Formula, and then outputted to a target detection section 17. The reception data DT1 corresponds to reception data RD that includes data for K number of channels, as will be described later.

[Mathematical Expression 1]

$$DT1 = \begin{pmatrix} x[1][1] & \cdots & x[1][N] \\ \vdots & \ddots & \vdots \\ x[K][1] & \cdots & x[K][N] \end{pmatrix} \quad (7)$$

As shown in FIG. 4, the target detection section 17 includes an interference suppression unit 30, a beat frequency detection unit 31 and an azimuth detection unit 33. The interference suppression unit 30 includes a short-time data cutting out part 19, a frequency spectrum calculation part 20, an interference frequency detection part 18, a DBF (digital beam forming) processing part 22, a maximum peak direction extraction part 23, an interference direction component removal part 26 and a buffer part 27.

Figure 5:
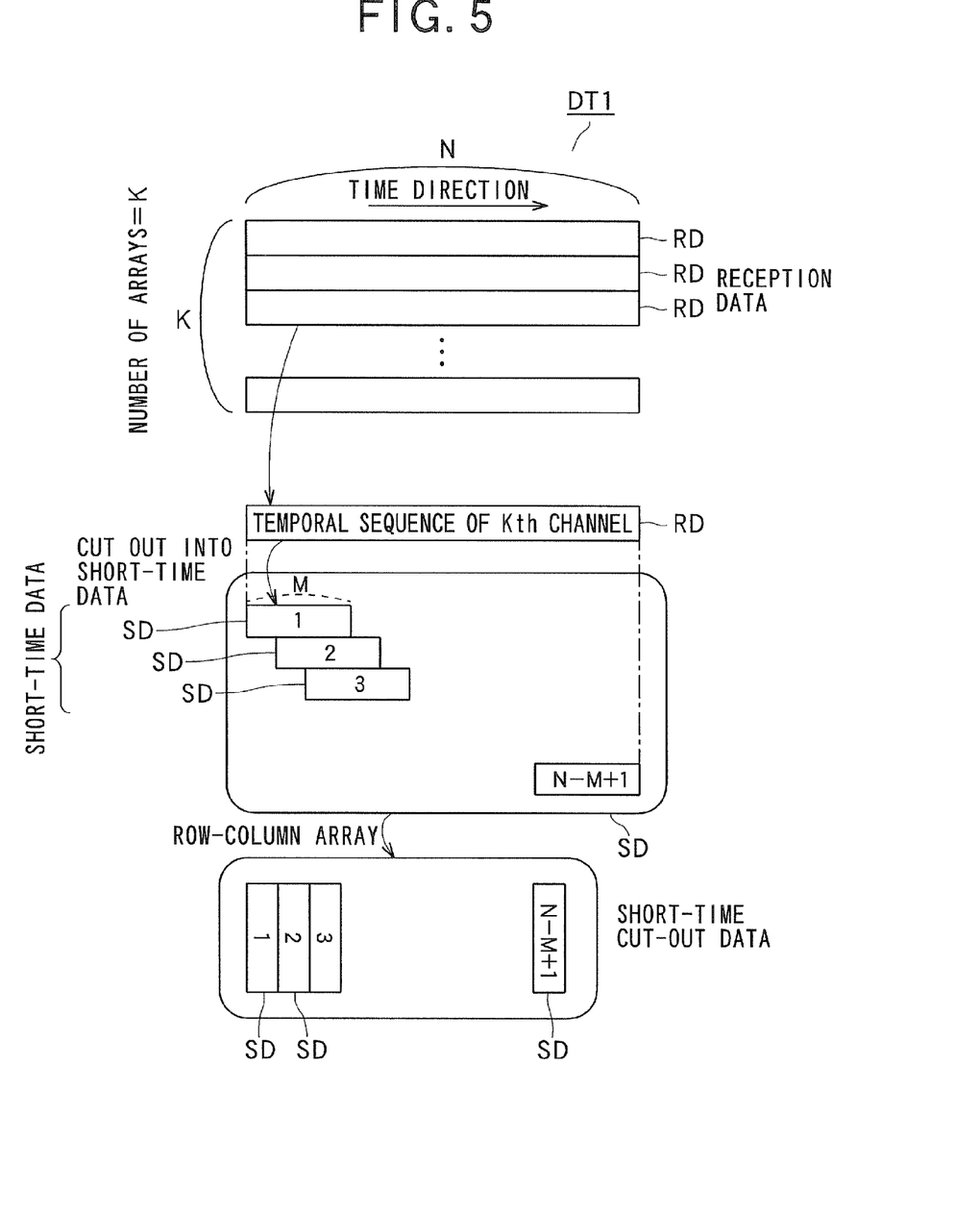
FIG. 5 is a schematic diagram illustrating the contents of a short-time data cutting out process.

As shown in FIG. 5, for each of the channels corresponding to the respective array antenna elements 6, the short-time data cutting out part 19 cuts out short data SD each including a number M (e.g., 32 variable data) of sampled data in the time direction as can be seen in the following formula, from the reception data RD, i.e. the N number of (e.g., 1024/snapshot) sampled data stored in the time direction. Then, the cut-out short-time data SD are rearranged in a row-column array. The rearranged cut-out data are expressed in Formula (8).

[Mathematical Expression 2]

$$\begin{pmatrix} x[k][1] & \ldots & x[k][t] & \ldots & x[k][N-M+1] \\ x[k][2] & \ldots & x[k][t+1] & \ldots & x[k][M-M+2] \\ \ldots & \ddots & \vdots & \ddots & \vdots \\ x[k][M] & \ldots & x[k][t+M-1] & \ldots & x[k][N] \end{pmatrix} \quad (8)$$

$$k = 1 \ldots K$$
$$t = 1 \ldots N - M + 1$$

Figure 6:
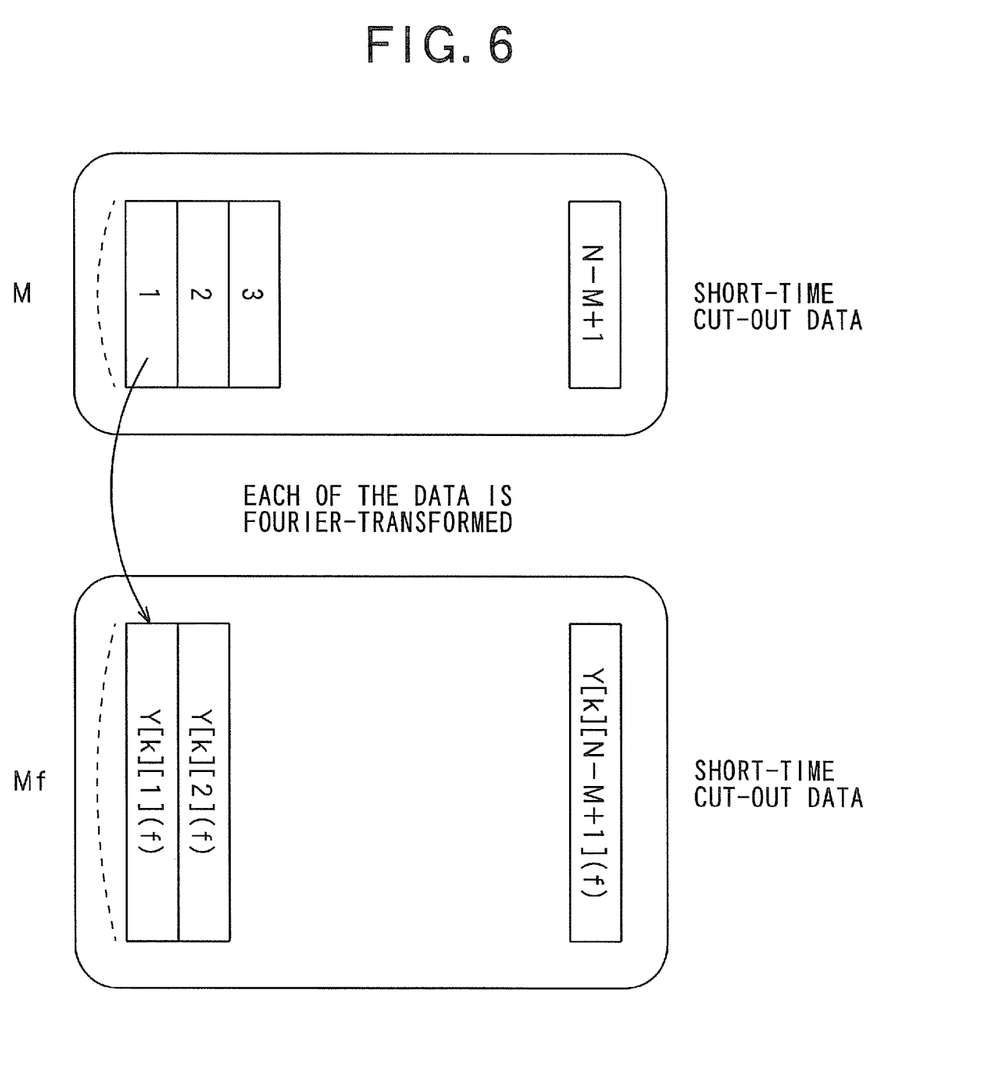
FIG. 6 is a schematic diagram illustrating the contents of frequency spectrum calculation processes.

Then, as shown in FIG. 6 and Formula (9), the frequency spectrum calculation part 20 performs discrete Fourier transformation for each of the short-time cut-out data for transformation into data Mf appropriate for a frequency region to thereby calculate the frequency spectrum. A short-time Fourier transformation data Y is expressed in Formula (9).

[Mathematical Expression 3]

$$(Y[k][1](f) \ldots Y[k][t](f) \ldots Y[k][N-M+1](f)) \quad (9)$$

Figure 7:
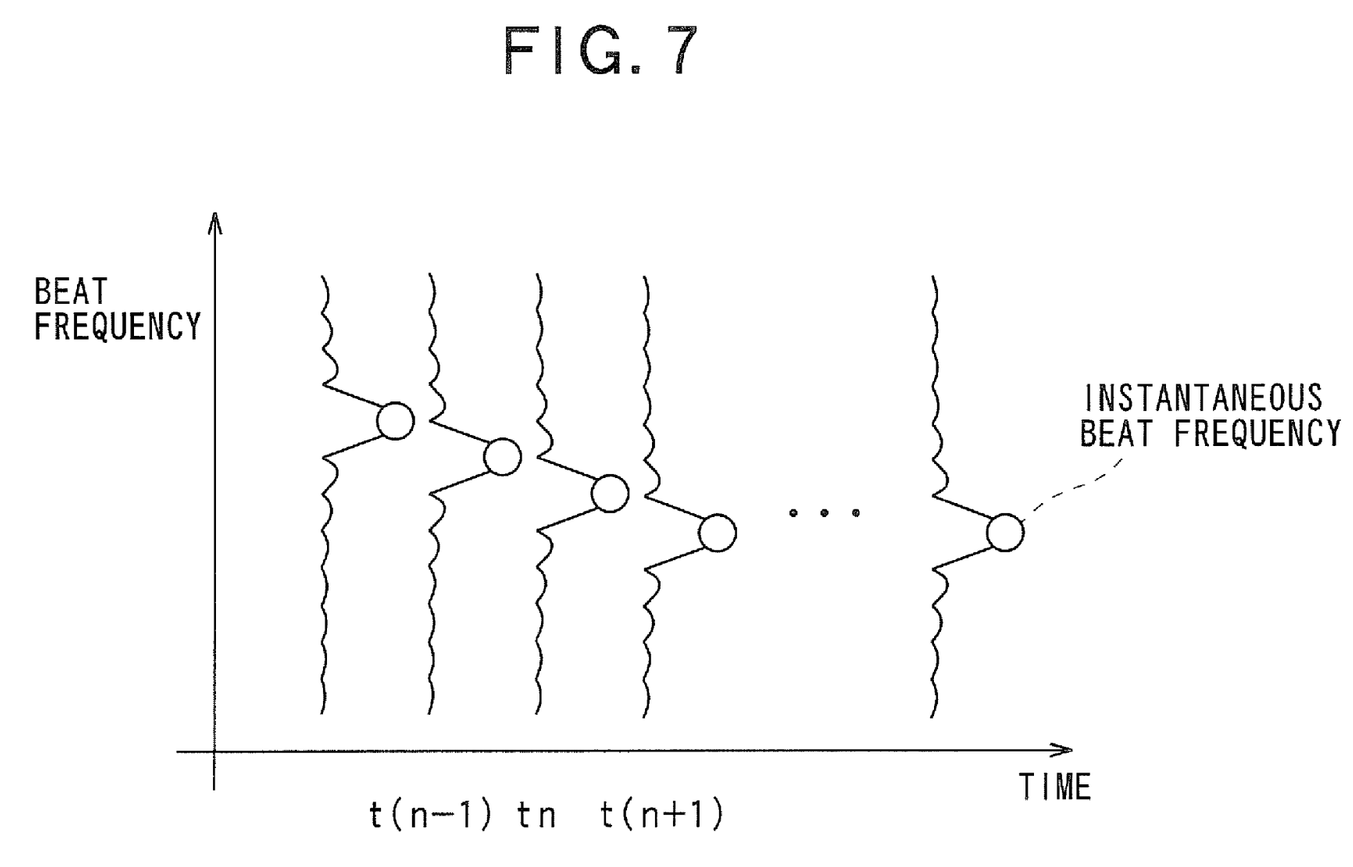
FIG. 7 is a schematic diagram illustrating instantaneous beat frequency of an interference signal at some time points.

The interference frequency detection part 18 calculates mean electrical power after the discrete Fourier transformation for the K channels, and then, as shown in FIG. 7, detects one or more peaks in the frequency direction. In the detection, the frequency where the mean electrical power level of a peak reaches the maximum point is determined as being the instantaneous beat frequency of interference components (interference component frequency) at each of time points tn. The instantaneous beat frequency (interference component frequency) is defined as expressed by Formula (10)

[Mathematical Expression 4]

$$f_{BA}[t], (t=1 \ldots N-M+1) \quad (10)$$

When the interference component frequency expressed by Formula (10) is enciphered, Formula (11) is obtained.

[Mathematical Expression 5]

$$f_{BA}[t] = \underset{f}{\operatorname{argmax}} \left( \frac{1}{K} \sum_{k=1}^{K} |Y[k][t](f)|^2 \right), t = 1 \ldots N - M + 1 \quad (11)$$

Then, the DBF processing part 22 performs a known DBF (digital beam forming) processing for the short-time Fourier transformation data Y. Details of the DBF processing are described in Non-patent Document 1. The symbol θ here indicates an azimuth for DBF scan.

The symbol Z[t](O) in Formula (12) indicates a spectrum obtained from the DBF processing.

[Mathematical Expression 6]

$$Z[t](\theta) = \left| \sum_{k=1}^{K} w_k(\theta) \cdot Y[k][t](f_{BA}[t]) \right|^2 \quad (12)$$

Then, for the frequency of the interference components, the peak direction extraction part 23 detects a peak value of an azimuth direction which maximizes the energy obtained by the DBF processing, using Formula (13).

[Mathematical Expression 7]

$$\theta_{PK}[t] = \underset{\theta}{\operatorname{argmax}}(Z[t](\theta)) \quad (13)$$

Then, the interference direction component removal part 26 estimates an absolute value of the incoming direction of the interference components on the basis of the obtained peak of the azimuth direction (peak of the frequency direction), using a known calculation method. As shown in FIG. 2 as well as (a) and (b) of FIG. 3, the incoming direction of the interference components obtained by this estimation is of either one of the interference waves Rx2 and Rx3 which are symmetric, both having the azimuth angle α with respect to the vehicle center CL (scanning center in the electronic scan of the transmission signal Tx). This value, which cannot be confirmed to be which of the above waves, is referred to the "absolute value of the incoming direction". This is because the interference waves Rx2 and Rx3, which are line symmetric with respect to the reception wave Rx1 as shown by (a) of FIG. 3, show similar interference patterns after mixing as shown by (b) of FIG. 3. Accordingly, even if the incoming direction obtained in the calculation is θT=α, for example, the actual incoming direction can be taken as being both the azimuths θ=α and −α.

However, without determining the incoming direction of the interference components, the interference direction component removal part 26 produces at every time point the following projection matrix h[t] that suppresses the interference components, on the basis of Formulas (14) and (15).

[Mathematical Expression 8]

$$P[t] = I - h[t] \cdot h[t]^H \quad (14)$$

The definition of h[t] can be made as expressed by Formula (15).

[Mathematical Expression 9]

$$h[t] = \begin{pmatrix} w_1(\theta_T[t]) \\ w_2(\theta_T[t]) \\ \vdots \\ w_K(\theta_T[t]) \end{pmatrix} \quad (15)$$

where $W_K(\theta)$ indicates the weight (steering vector) of the DBF for the azimuth θ.

By applying this to the original reception data SD (see FIG. 5), a reception signal $X_C[t]$ after the interference component suppressing process, can be obtained.

[Mathematical Expression 10]

$$X_C[t] = \begin{pmatrix} x_C[1][t] \\ \vdots \\ x_C[K][t] \end{pmatrix} = P[t] \cdot \begin{pmatrix} x[1][t] \\ \vdots \\ x[K][t] \end{pmatrix} \quad (16)$$

The buffer part 27 stores the short-time data SD, i.e. the reception signal $X_C[t]$, having suppressed interference components by the number equal to the original number of data. Thus, the short-time data SD that have been cut out by the short-time data cutting out part 19 and have been removed with the interference direction components by the interference direction component removal part 26, are restored to the reception data RD and DT1 (see FIG. 5) before being cut out, and then transmitted to the downstream beat frequency detection unit 31. In this way, the interference components are removed (suppressed) from the beat signal stored in the buffer unit 14 of the transmission/reception section 4 shown in FIG. 4, and the resultant signal is appropriately outputted in the form of a signal S4 to the downstream beat frequency detection unit 31.

As described above, the signal SS after the removal (suppression) of the interference components has been obtained through the suppression processing without being subjected to a process of determining the positive/negative sign of the incoming direction of the interference signal components that have replicated at the intersection of the transmission wave and the interference wave shown by (b) of FIG. 3. Thus, removal of the interference components can be ensured without determining the positive/negative sign of the incoming direction.

Figure 8:
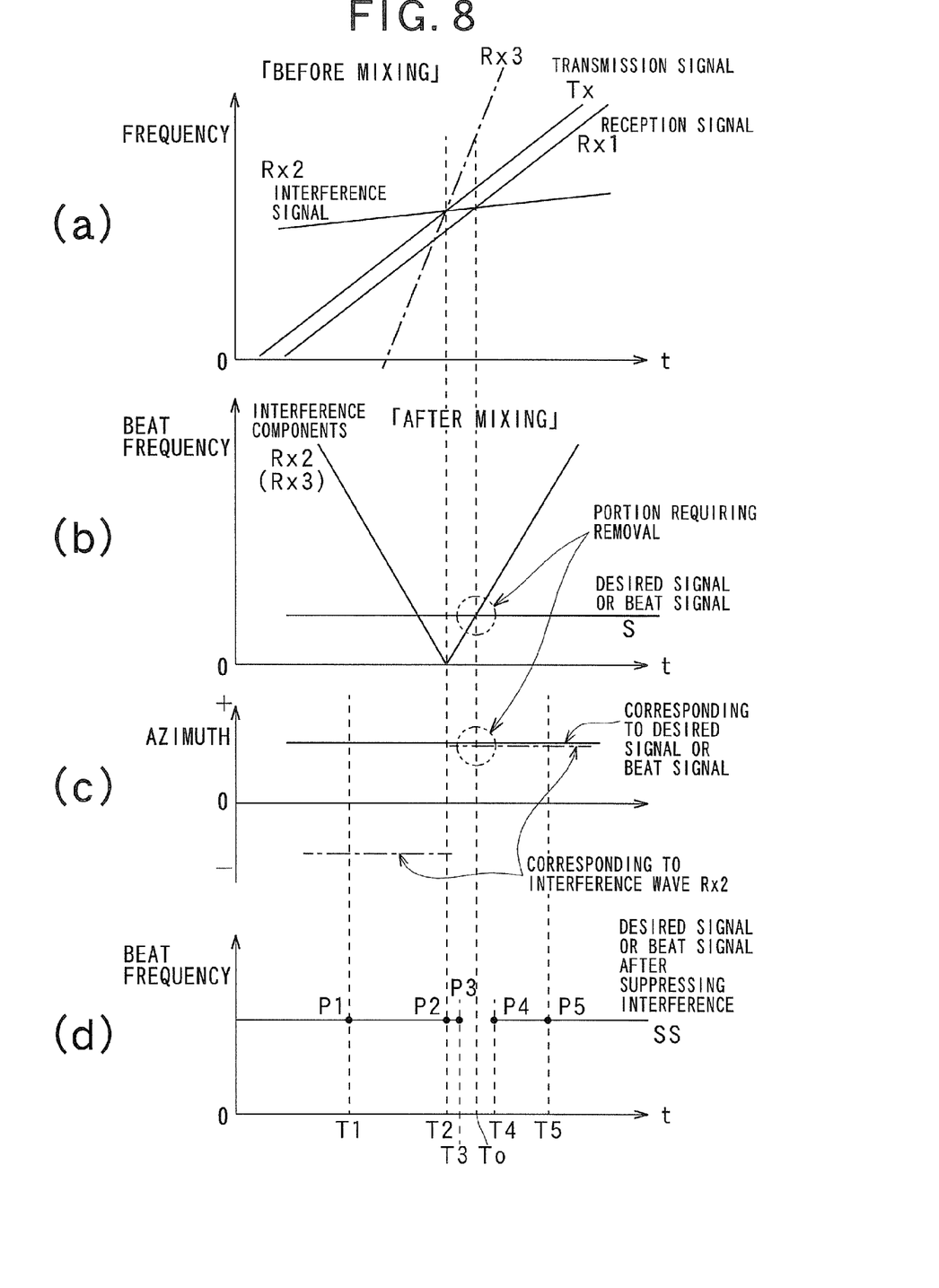
FIG. 8 shows by (a) frequency variation of a transmission wave, a reflected wave and an interference wave with respect to time, prior to performing mixing, by (b) a beat signal after performing mixing of these signals, by (c) a diagram concerning azimuth after DBF; and by (d) a diagram illustrating a desired beat signal SS after removing a beat signal of an interference wave from the beat signal, on the basis of the azimuth information.

Description hereinafter is given by referring to FIG. 8. Since (a) and (b) of FIG. 8 are the same as (a) and (b) of FIG. 3, the explanation is omitted. Similar to FIG. 3, FIG. 8 also exemplifies a condition involving a target and an interference wave as shown in FIG. 2.

For example, in one incoming azimuth of the interference signal, which corresponds to the condition as shown in FIG. 2 as well as (a) and (b) of FIG. 8, for example, azimuth information after DBF may be as shown by (c) of FIG. 8. Specifically, a positive value α can be derived from the azimuth corresponding to the beat signal, or the desired signal, having substantially constant beat frequency with respect to time in (b) of FIG. 8. Also, an azimuth α can be derived from the interference wave Rx2, or the transmission wave, from the oncoming vehicle 52. Meanwhile, the azimuth corresponding to a beat signal reverse of the interference wave Rx2 is −α. Accordingly, in the interference wave Rx2 after mixing shown by (b) of FIG. 8, the beat signal whose beat frequency has been reversed at zero can be distinguished because, after DBF, the azimuth of the beat signal having reversed beat frequency will have a positive/negative sign which is different from that of the desired beat signal S. Thus, in case of removing the beat signal corresponding to the interference wave Rx2, removal can be performed for only the beat signal corresponding to the frequency wave Rx2 whose positive/negative sign of the incoming azimuth is reverse of the beat signal S corresponding to the reflected wave Rx1, using the filtering of the projection matrix. On the other hand, some of the beat signals corresponding to the interference waves Rx2 have an incoming azimuth whose positive/negative sign is identical with that of the beat signal S corresponding to the reflected wave Rx1. In this case, the reflected wave Rx1 and such an interference wave Rx2 are removed together because no distinction can be made therebetween. The removal width in such a case corresponds to the portion enclosed by a broken line in (b) of FIG. 8, which resides in the portion where the desired beat signal S and the beat frequency of the interference wave Rx2 intersect with each other. A beat signal SS resulting from such a removal is indicated by (d) of FIG. 8. As shown by (d) of FIG. 8, the beat frequency of the interference wave Rx2 has also been removed together with the originally desired beat signal S, during the period corresponding to the time between T3 and T4 centering on time To. It should be appreciated that the removal width can be made large when the intensity of the signal is high, and can be made small when the intensity of the signal is low.

The beat signal SS whose interference components have been suppressed by the interference suppression unit 30 of the target detection section 17 is subjected to known processes in the beat frequency detection unit 31 and the azimuth detection unit 33, for calculation, for example, of a distance between the own vehicle and a target, such as a preceding vehicle, as well as relative speed and azimuth with respect to the target. Further, the resultant signal is subjected to a temporal tracking process in the target tracking section 35 shown in FIG. 4, which process is followed by a calculation process to detect, for example, a preceding vehicle. The processes performed in the target tracking section 35 are based on a well-known technique, the details of which are described in Japanese Patent Laid-Open No. 2003-270341, for example. The detailed description on the contents of these processes therefore is omitted herein. Also, the processes performed in the beat frequency detection unit 31 and the azimuth detection unit 33, are based on a well-known technique as described, for example, in Non-patent Document 1 The detailed description therefore is omitted herein.

The present embodiment has been described assuming that these processes and the operation contents are realized in the form of signal processing software which is run, for example, by a microprocessor or a digital signal processor. Alternatively, these processes and the operation contents may be realized in the form of an integrated circuit, such as an FPGA or LSI, formed on a semiconductor element.

In the embodiment described above, the processing parts configuring the interference suppression unit 30 have the following functions:

A) The short-time data cutting out part 19 which cuts out a is plurality of short-time channel data from multi-channel data received from the upstream buffer unit;

B) The frequency spectrum calculation part 20 which calculates a short-time frequency spectrum from the short-time data;

C) The interference frequency detection part 18 which detects an interference component frequency from the short-time frequency spectrum;

D) The DBF processing part 22 which performs DBF (digital beam forming) processes;

E) The maximum peak direction extraction part 23 which calculates the azimuth of interference components from the results of the DBF processes;

G) The interference direction component removal part 26 which operates a filter for suppressing the components of an associated azimuth direction from the plurality of short-time channel data, on the basis of the calculated azimuth of the interference components; and (H) The buffer part 27 which merges the plurality of short-time channel data after the interference component suppression to restore the original data length.

In this way, it is so configured that, in the case where, for example, an FM-CW or CW radar wave and the like is received as an interference wave from an oncoming vehicle, for example, the short-time data of the interference wave are cut out and processed even when the interference component frequency temporally varies. Thus, the frequency in the cut-out time range is substantially unchanged, which enables the frequency spectrum calculation part 20 and the interference frequency detection part 18 to detect and suppress the interference component frequency in the time section.

Figure 9:
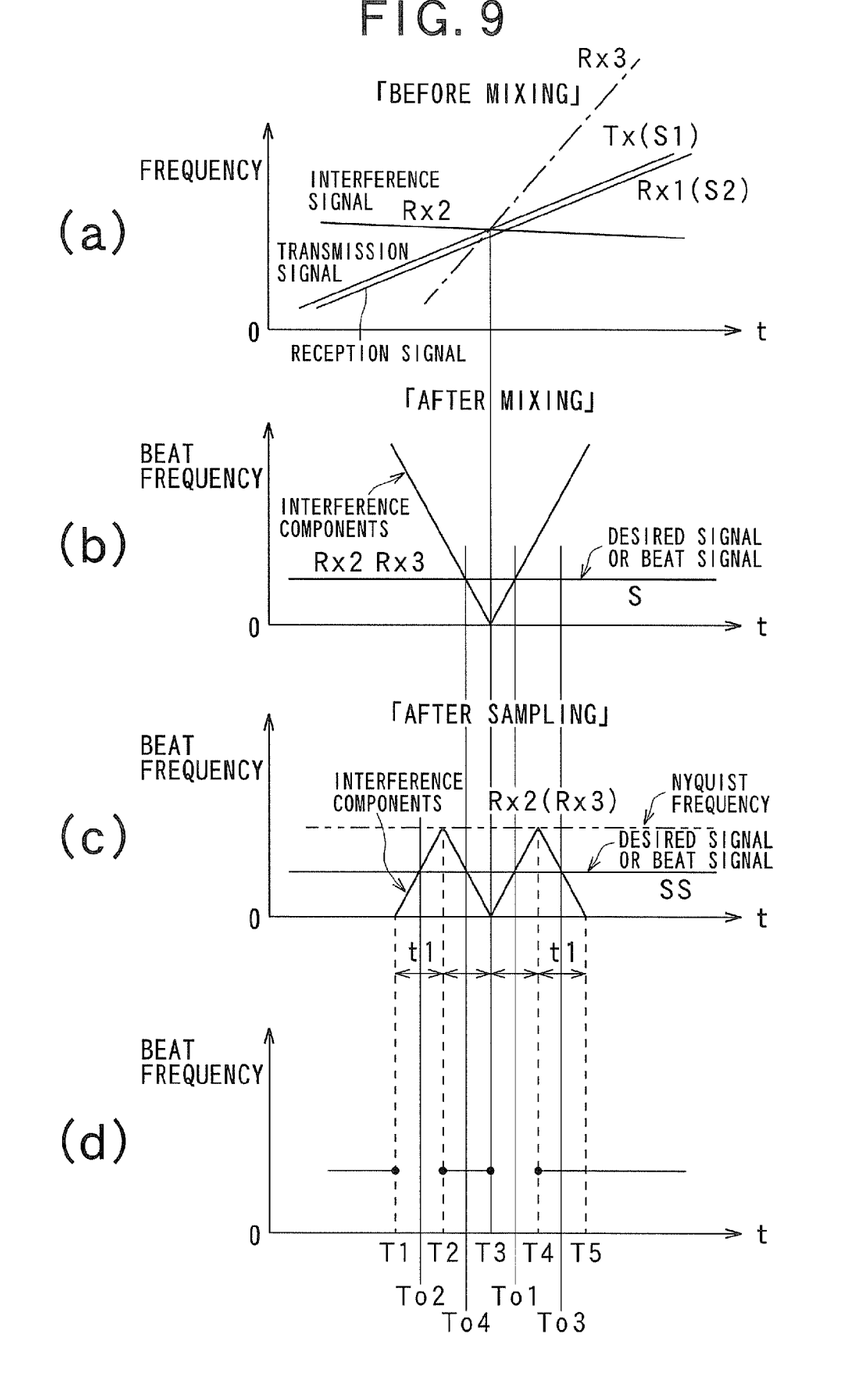
FIG. 9 shows by (a) frequency variation of a transmission wave, a reflected wave and an interference wave with respect to time, prior to performing mixing, by (b) a beat signal after performing mixing of these signals, by (c) a diagram illustrating the beat signal after sampling, and by (d) a diagram illustrating a desired beat signal SS after removing a beat signal of an interference wave from the beat signal, on the basis of the azimuth information.

Referring now to FIG. 9, hereinafter is described a modification of the first embodiment. Since (a) and (b) of FIG. 9 are the same as (a) and (b) of FIG. 3, the explanation is omitted.

FIG. 9 shows by (c) the results of sampling the beat frequency shown by (b) of FIG. 9 using an AD converter. Most commonly, the beat signal of the frequency wave Rx2 replicates at ½ of the sampling frequency, or at the so-called Nyquist frequency. Accordingly, as can be seen from (c) of FIG. 9, the frequency after sampling has a pattern in which the beat frequency turns between zero and the Nyquist frequency.

In the modification shown in FIG. 9, as can be seen from (b) of FIG. 9, the beat signal S corresponding to the reflected wave Rx1 intersects with the replicated beat signal corresponding to the interference wave Rx2 in a time range To1 to To4. However, in the intersection, the positive/negative signs are coincident with each other between the incoming azimuths of the beat signal S and the beat signal of the interference wave Rx2 with respect to the time points To1 and To2, but are inverted from each other with respect to the time points To3 and To4. Accordingly, the present modification removes the beat signal during the period when the positive/negative signs of the incoming azimuths are coincident with each other. To elaborate, the filter removes both the beat signal S and the beat signal of the interference wave Rx2, which fall between time points T1 and T2 sandwiching the time point To2 and between time points T3 and T4 sandwiching the time point To1. Also, the filter removes only the beat signal of the interference wave Rx2 up to the time point T1, between the time points T2 and T3, and on or after the time point T4.

As described above, in view of the Nyquist frequency after sampling, in the case where the beat frequency of the interference wave Rx2 (Rx3) replicates both at the zero frequency and at the Nyquist frequency, efficiency can also be attained by ensuring removal of all the periods in which the positive/negative signs of the incoming azimuths are coincident with each other between the reflected wave Rx1 and the interference wave Rx2.

In the present modification as well, similar to the first embodiment, removal widths (periods) may be set sandwiching the time points To1 and To2, considering, for example, the electrical power of the interference waves.

Figure 10:
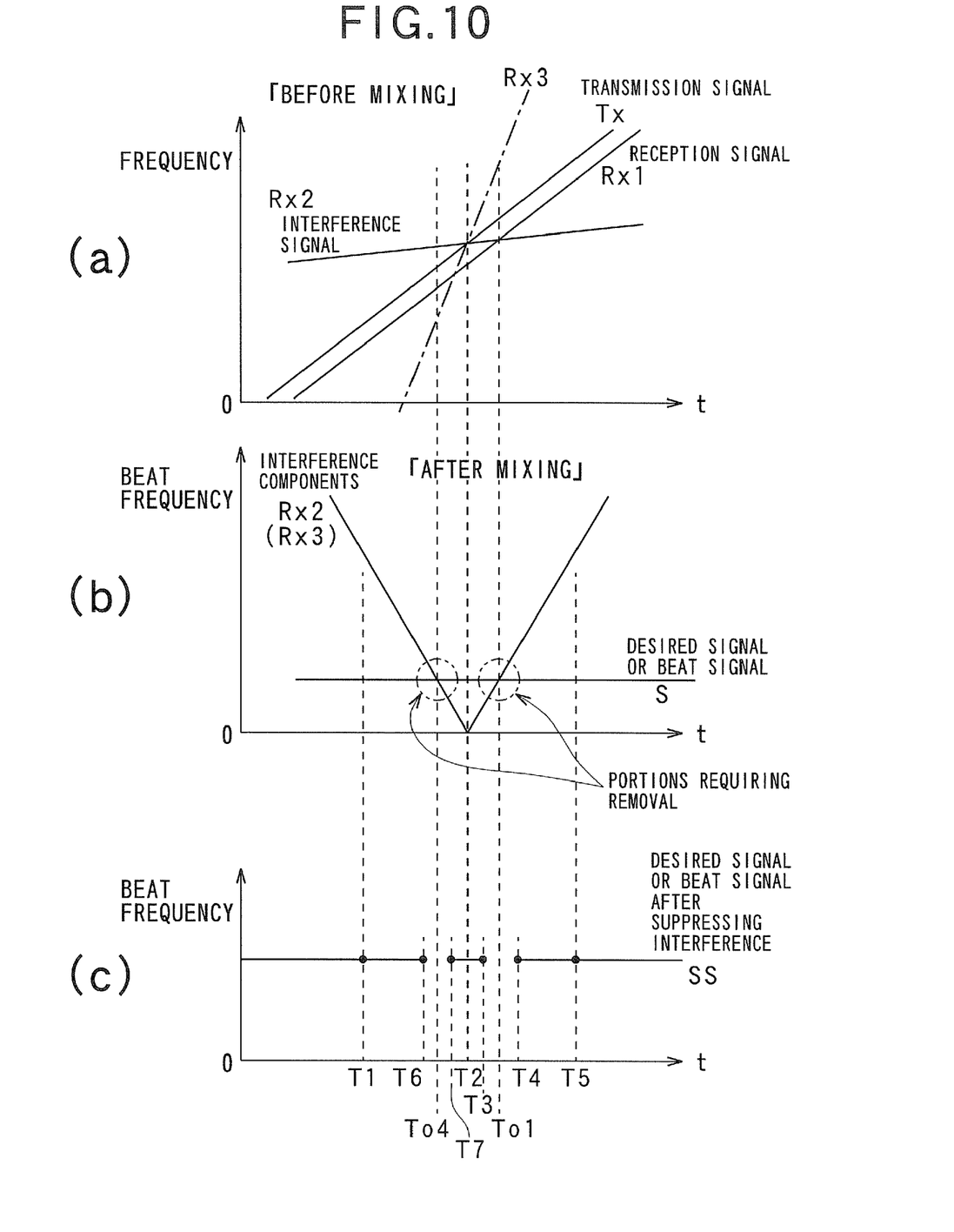
FIG. 10 shows by (a) frequency variation of a transmission wave, a reflected wave and an interference wave with respect to time, prior to performing mixing, by (b) a beat signal after performing mixing of these signals, and by (d) a diagram illustrating a desired beat signal SS after removing a beat signal of an interference wave from the beat signal, not based on the azimuth information.

Referring to FIG. 10, hereinafter is described a second embodiment.

Since (a) and (b) of FIG. 10 are substantially the same as FIG. 3, the explanation is simplified.

The second embodiment greatly differs from the above embodiment and modification in that no DBF function is provided. In the second embodiment, removal using the projection matrix, for example, is performed for two intersections between the beat signal S corresponding to the reflected wave Rx1 and the beat signal corresponding to the interference wave Rx2 after being mixing by a mixer. Specifically, both the beat signal S and the beat signal of the interference wave Rx2 are removed from the interference frequency at the intersections mentioned above or during the periods including the intersections, and in all else, only the beat signal of the reference wave Rx2 is removed. More specifically, as shown by (c) of FIG. 10, the intersections mentioned above reside at the time points To4 and To1. Thus, both the beat signal S and the beat signal of the reference wave Rx2 are removed by the filter during both of the periods between time points T6 and T7 and between the time points T3 and T4, which correspond to the widths (periods) around the time points To4 and To1. During other periods, only the beat signal of the interference wave Rx2 is removed. In this way, use of transient information of the interference frequency components with respect to time, enables suppression of the interference components, without the necessity of obtaining the azimuth information using DBF.

In the second embodiment, the azimuth detection unit 33, the DBF processing part 22 and the maximum peak direction extraction part 23 shown in FIG. 4 can be omitted. As a result, the interference direction component removal part 26 can remove the interference components using the transition information on the interference frequency components with respect to time, without using the azimuth information, such as a peak direction.

The present invention may be further modified variously, without being limited to the embodiments or modification described above.

For example, the embodiments and modification described above have been configured to allow a short-time data cut-out part 9 to just cut out the M number of data continuing in the time direction. In the ultimate sense, in the case where N=1024 is established, M=1023 could have been established. In other words, the short-time data cut-out part 9 only had to perform retrieval to obtain data in the form of two or more continuous data groups having different time zones. Alternatively, for example, the short-time data cut-out part 9 may retrieve time data shorter than the sampling time of the short-time data SD, i.e. a replicating time t1 of the interference wave Rx2 (Rx3) shown by (c) of FIG. 9. This may considerably reduce the variation in the beat frequency of the interference components so that no bending (reversion) can occur, whereby the beat frequency of the interference wave can be more appropriately calculated.

Further, the embodiments and modification described above have allowed the maximum peak direction extraction part 23 to detect a maximum peak value of an azimuth direction in which the energy obtained through the DBF processes would maximized. Alternatively, only a peak may be ensured to be detected instead of the maximum value. In other words, if there are a plurality of peaks, the interference components may be ensured to be removed on the basis of the plurality of peaks. In this case, a time profile of the peaks is required to be estimated. Accordingly, although the calculation may be complicated comparing with the case where the maximum peak value is used, there may be no problem in terms of the performance. Conversely, use of the maximum peak value as described above can present an advantage of simplifying the calculation.

Further, for example, the first embodiment described above has been provided with the azimuth detection unit 33 to give azimuth information of a target to the operator tracking process section 35. The configuration is not limited to this. The present invention may also be applied to a system which does not calculate azimuth information, i.e. a system without having the azimuth detection unit 33.

The embodiments, modification and further modifications described above may be adequately combined, and are not intended to be limited to the contents described above.

INDUSTRIAL APPLICABILITY

The present invention may be utilized in an on-vehicle electronically scanned radar system using the FM-CW technique.

What is claimed is:

1. An electronically scanned radar system comprising: a transmitting antenna for freely emitting a transmission signal consisting of a continuous wave; a receiving antenna consisting of antenna elements corresponding to respective channels; a mixer for obtaining a beat signal by mixing a reception signal received by each of the antenna elements with the transmission signal; an AD converter for obtaining a reception data consisting of an N number of sampled data by sampling the beat signal obtained by the mixer at a predetermined sampling frequency; and a target detection section for detecting a distance from a target or/and a relative speed of the a target, on the basis of the reception data sampled by the AD converter, characterized by:
- a data cutting out part for cutting out an (N−M+1) number of data each consisting of an M (<N) number of sampled data continuous in the time direction, from the reception data consisting of the N number of sampled data;
- a frequency spectrum calculation part for calculating a frequency spectrum of each of the (N−M+1) number of data;
- an interference frequency detection part for detecting an interference component frequency of an interference wave from the frequency spectrum;
- an interference component removal part for removing the interference component frequency from the beat signal, the interference component frequency being detected by the interference frequency detection part;
- a buffer part for merging the data cut out by the data cutting out part and removed with the frequency components to restore a data having a length before being cut out; and
- detection of a distance from the target or/and a relative speed of the target on the basis of the data restored by the buffer part.

2. The radar system according to claim 1, characterized in that the data cutting out part sets the number M so that the frequency is substantially unchanged in the continuous M number of sampled data in the case where the M number of sampled data is sampled by the sampling frequency.

3. The radar system according to claim 2, characterized in that, in removing the interference component frequency detected by the interference frequency detection part from the beat signal, the interference component removal part removes the beat signal from a portion where the beat signal corresponding to the reception wave intersects with the beat signal corresponding to the interference wave.

4. The radar system according to claim 3, characterized in that the interference component removal part is a projection matrix working on the data cut out by the data cutting out part.

5. The radar system according to claim 4, characterized in that:
- the channel is provided in plural number, and a plurality of reception antennas are provided, each reception antenna consisting of antenna elements corresponding to the plurality of channels;
- the mixer is provided in plural number in order to obtain a beat signal for each of the antenna elements by mixing a reception signal received by each of the antenna elements with the transmission signal; and
- the AD converter is provided in plural number in order to sample the beat signal of each of the channels at a predetermined sampling frequency, which beat signal has been obtained from each of the plurality of mixers, to obtain the reception data consisting of the N number of sampled data for each of the channels corresponding to the respective antenna elements.

6. The radar system according to claim 5, characterized in that the system comprises a peak direction extraction part for performing a digital beam forming process for the interference component frequency to extract a peak of the electrical power of an azimuth direction from the interference component frequency, and the interference component removal part calculates an absolute value of an incoming direction of the interference component frequency extracted at the peak direction extraction part and uses a filter for removing the interference component frequency on the basis of the absolute value.

7. The radar system according to claim 6, characterized in that the filter is a projection matrix that works on the data cut out by the data cutting out part.

8. The radar system according to claim 7, characterized in that the interference frequency detection part detects the interference component frequency on the basis of time transient information of the frequency spectrum.

9. The radar system according to claim 8, characterized in that the interference frequency detection part detects a component as the interference component frequency, which component maximizes an electrical power value of the frequency spectrum.

10. The radar system according to claim 5, characterized in that the system comprises a peak direction extraction part for performing a digital beam forming process for the interference component frequency to extract a peak of the electrical power of an azimuth direction from the interference component frequency, and the interference component removal part uses a filter for removing only a portion where the beat signal corresponding to the interference wave coming from the same direction as that of the reception wave intersects with the beat signal corresponding to the reception signal, from the beat signal in a portion where the beat signal corresponding to the reception signal intersects with the beat signal corresponding to the interference wave.

11. The radar system according to claim 1, characterized in that, in removing the interference component frequency detected by the interference frequency detection part from the beat signal, the interference component removal part removes the beat signal from a portion where the beat signal corresponding to the reception wave intersects with the beat signal corresponding to the interference wave.

12. The radar system according to claim 1, characterized in that the interference component removal part is a projection matrix working on the data cut out by the data cutting out part.

13. The radar system according to claim 1, characterized in that:
- the channel is provided in plural number, and a plurality of reception antennas are provided, each reception antenna consisting of antenna elements corresponding to the plurality of channels;
- the mixer is provided in plural number in order to obtain a beat signal for each of the antenna elements by mixing a reception signal received by each of the antenna elements with the transmission signal; and
- the AD converter is provided in plural number in order to sample the beat signal of each of the channels at a predetermined sampling frequency, which beat signal has been obtained from each of the plurality of mixers, to obtain the reception data consisting of the N number of sampled data for each of the channels corresponding to the respective antenna elements.

14. The radar system according to claim 13, characterized in that the system comprises a peak direction extraction part for performing a digital beam forming process for the interference component frequency to extract a peak of the electrical power of an azimuth direction from the interference component frequency, and the interference component removal part calculates an absolute value of an incoming direction of the interference component frequency extracted at the peak direction extraction part and uses a filter for removing the interference component frequency on the basis of the absolute value.

15. The radar system according to claim 14, characterized in that the filter is a projection matrix that works on the data cut out by the data cutting out part.

16. The radar system according to claim 13, characterized in that the system comprises a peak direction extraction part for performing a digital beam forming process for the interference component frequency to extract a peak of the electrical power of an azimuth direction from the interference component frequency, and the interference component removal part uses a filter for removing only a portion where the beat signal corresponding to the interference wave coming from the same direction as that of the reception wave intersects with the beat signal corresponding to the reception signal, from the beat signal in a portion where the beat signal corresponding to the reception signal intersects with the beat signal corresponding to the interference wave.

17. The radar system according to claim 1, characterized in that the interference frequency detection part detects the interference component frequency on the basis of time transient information of the frequency spectrum.

18. The radar system according to claim 1, characterized in that the interference frequency detection part detects a component as the interference component frequency, which component maximizes an electrical power value of the frequency spectrum.

* * * * *